United States Patent Office 3,258,462
Patented June 28, 1966

3,258,462
2-AMINO-4-ALKOXY-6-(4-PHENYLPIPERAZINO) ALKYLENE-s-TRIAZINES
Takashi Tsuda, Ikeda, Saburo Takei, Kyoto, and Teruaki Tsujikawa, Otsu, Japan, assignors to Takeda Chemical Industries, Ltd., Osaka, Japan
No Drawing. Filed Nov. 18, 1963, Ser. No. 324,212
Claims priority, application Japan, Nov. 20, 1962, 37/51,815
16 Claims. (Cl. 260—249.5)

This invention relates to novel and useful 2-amino-4-alkoxy-6-(4-phenylpiperazino)alkylene-s-triazines. More concretely, the present invention relates to s-triazine compounds represented by the general Formula I, their addition salts and the production thereof:

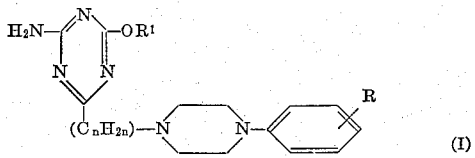

(I)

wherein $R^1$ represents methyl or ethyl, R represents hydrogen, a halogen such as flourine, chlorine, bromine and iodine, methyl or ethyl, and $n$ stands for an integer from 2 to 3.

As far as the present inventors believe, the production of these compounds was realized by themselves prior to anyone else. It was also found that the compounds of said category show a remarkable effect in depressing blood pressure and also show such an interesting action as diminishing conflict reflex in animals while the administration of these compounds in an effective amount causes no harm to any functions of bodies. Therefore, the compounds provide novel pharmaceuticals which are useful as psychotherapeutic agents or as hypotensive agents.

The principal object of this invention is therefore to provide the novel and useful s-triazine compounds represented by the general Formula I and their pharmaceutically acceptable addition salts. It is another object of this invention to provide a novel method for producing the novel and useful s-triazine compounds represented by the general Formula I.

The latter object is realized by effecting a reaction between guanyl-O-alkylisourea, in which the alkyl group is methyl or ethyl, and a reactive derivative of the carboxylic acid represented by the formula:

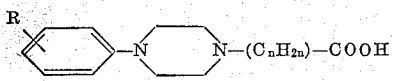

wherein R and $n$ have respectively the same meanings as defined above. The reactive derivative of the carboxylic acid may for example be an acid anhydride, including the homogeneous acid anhydride and the acid halide—e.g. chloride or bromide—an ester, including the lower alkyl ester—e.g. methyl ester or ethyl ester—and the orthoester—e.g. methyl orthoester or ethyl orthoester—a nitrile or an acid amide. The substituent represented by R can attach to any position in the phenyl group. Preferable carboxylic acids may be exemplified by α- or β-(4-phenylpiperazino)propionic acid, α- or β- or γ-(4-phenylpiperazino)butyric acid, β-(4-phenylpiperazino)isobutyric acid, β-[4-(o- or m- or p-chlorophenyl)piperazino] propionic acid, β- or γ-[4-(o- or m- or p-chlorophenyl) piperazino]butyric acid, β-[4-(bromophenyl)piperazino] propionic acid, β-[4-(iodophenyl)piperazino]propionic acid, β-[4-(fluorophenyl)piperazino]propionic acid, β-(4-tolylpiperazino)propionic acid, β- or γ-(4-tolylpiperazino) butyric acid and β-[4-(methoxyphenyl)piperazino]propionic acid.

The reaction is carried out preferably in a solvent. When an ester including the orthoester is used as the reactive derivative of the carboxylic acid, it is recommended to employ as the solvent a lower alcohol such as methanol or ethanol, or a mixture of said lower alcohol and an inert organic solvent such as benzene, toluene, dioxane or tetrahydrofuran. In this case, the reaction proceeds usually at a room temperature or lower, but it may be accelerated by heating, if desired.

On the other hand, when an acid anhydride including the acid halide is used as the reactive derivative of the carboxylic acid, the carboxylic acid or hydrohalogenic acid, which is formed as the reaction proceeds, is desirably neutralized by a suitable base so that the reaction may be carried out smoothly. The base for the purpose may include, for example, an alkali metal hydroxide—e.g. sodium hydroxide or potassium hydroxide—an alkali metal alkoxide—e.g. sodium methoxide, sodium ethoxide, potassium methoxide or potassium ethoxide—and a tertiary amine—e.g. pyridine, trimethylamine or triethylamine. The suitable solvent in this case is exemplified by water, methanol, ethanol, dioxane, tetrahydrofuran, acetonitrile and a mixture of two or more of these. Although desirable reaction temperature is generally lower than 0° centigrade, the reaction may of course be effected at an ambient temperature or higher under heating.

The guanyl-O-alkylisourea is usually provided as its salt formed with an inorganic acid such as hydrochloric acid, hydrobromic acid or sulfuric acid. In practice, such a salt of guanyl-O-alkylisourea is desirably changed into the free base, prior to or during the reaction of this invention, by the addition of an alkali metal hydroxide or an alkali metal alkoxide, for example.

The so-prepared s-triazine compounds represented by the Formula I can form the corresponding acid addition salt with an acid which is exemplified by mineral acids such as hydrochloric acid, hydrobromic acid, sulfuric acid, nitric acid and carbonic acid, and organic acids such as acetic acid, formic acid, succinic acid, citric acid, maleic acid, fumaric acid, tartaric acid, benzenesulfonic acid, toluenesulfonic acid, methanesulfonic acid and picric acid.

The s-triazine compounds can easily form the corresponding addition salt with an alkyl halide or an alkyl sulphate to give the quaternary ammonium salt, owing to the presence of tertiary nitrogen atoms in their molecule. Such addition salts, i.e. quaternary ammonium salts, include, for example, methiodide, methosulfate, methyl methosulfate, ethiodide and ethobromide.

These addition salts, i.e. the acid addition salts and the quaternary ammonium salts, function to solubilize said free s-triazines in water or to cause them to solidify when obtained in oily state, which does not deviate from the scope of the present invention.

s-Triazine compounds of the present invention show psychosedative action, when administered orally to animals such as rabbits, cats and monkeys in an amount of about 50 milligrams per kilogram of the body weight. Especially in monkeys, a remarkable diminution of conflict behavior is observed; and in mice the above effect is shown in a form of diminution of spontaneous movement or antagonism against central excitants. These s-triazine compounds also show potentiation of barbital hypnosis when administered along with the latter into mice, and show hypothermic effect in rabbits.

On the other hand, intravenous administration of these compounds in an amount of 0.5 milligram per kilogram of the body weight of anesthetized cats causes rapid and prolonged fall in the blood pressure and blocks the elevation of hypertensive response caused by epinephrine or norepinephrine; in other words, they show an adrenolytic effect. The mode of this action may be due to the combination of central, adrenolytic and peripheral actions. It should be stressed here that, in spite of the obvious and remarkable hypotensive activity of these compounds, they do not act to diminish the coronary flow of blood, but render rather a slight increase of the same.

Acute toxicity of these s-triazine compounds was found to be about 400 to 460 milligrams per kilogram (orally) and about 88 to 96 milligrams per kilogram (intravenously) in terms of $LD_{50}$. Prolonged oral administration of 125 milligrams per kilogram per day of the compounds to rats during 70 days causes no change in blood counts nor histological change in main viscera such as heart, spleen, kidney and digestive tract. Accordingly, the compounds of the present invention are useful as psychotherapeutic agents or as hypopressive agents.

When actually administered as a medicine, the s-triazine compounds or their addition salts may be taken per se or as a suitable preparation depending on the conditions of the patients. As these compounds of the present invention are chemically stable, they can be processed into a desired preparation after the per se known manner. A few examples of preparations of these compounds are shown as follows:

(I) TABLETS

| | Milligrams per tablet |
|---|---|
| 2-amino-4-methoxy-6-[2-(4-phenylpiperazino)ethyl]-s-triazine | 5 |
| Lactose | 90 |
| Cornstarch | 43 |
| Magnesium stearate | 2 |
| | 140 |

Tablets so-prepared may further be coated with sugar.

(II) SUSPENSION

| | Milligrams |
|---|---|
| 2-amino-4-methoxy-6-[2-(4-phenylpiperazino)ethyl]-s-triazine | 50 |
| Carboxymethylcellulose (sodium salt) | 500 |
| Polysorbate 80 | 100 |

Distilled water, up to 100 cubic centimeters.

(III) SUPPOSITORIES

| | Per suppository |
|---|---|
| 2-amino-4-methoxy-6-[2-(4-phenylpiperazino)ethyl]-s-triazine | 5 milligrams. |
| Cacao fat | A proper quantity. |

The following examples of presently-preferred embodiments are solely for the purpose of illustration and are not to be construed as limitations of this invention, many variations being possible without departing from the spirit or scope of this invention. In these examples, temperatures are all in degrees and uncorrected; percentages are on the weight basis; and abbreviations "g." and "cc." should be read as "gram(s)" and "cubic centimeter(s)."

*Example 1*

A solution of metallic sodium (1.7 g.) in methanol (40 cc.) is added to a solution of guanyl-O-methylisourea (6.1 g.) in methanol (30 cc.). Ethyl 3-(4-phenylpiperazino)propanoate (10.5 g.) is added to the mixture under cooling and dissolved therein. Then, the mixture is allowed to stand at room temperature for three days, followed by the addition of water (200 cc.), further allowed to stand for three days, and concentrated under reduced pressure to give crystals. The crystals are recrystallized from an aqueous methanol to obtain 2-amino-4 - methoxy - 6 - [2-(4-phenylpiperazino)ethyl]-s-triazine (4.18 g.) as colorless flakes melting at 166–168°.

The product is dissolved in methanolic hydrochloric acid and the solution is allowed to stand overnight to separate crystals. The crystals are dissolved in a small amount of methanol, followed by the addition of ether to obtain the trihydrochloride as colorless fine crystals melting at 110–114° with decomposition.

The free base product (1 g.) and methyl iodide (10 cc.) are added to ethanol (30 cc.). The mixture is refluxed for three hours, and then cooled to separate crystals, which are recrystallized from methanol to obtain the methiodide—i.e. 1-methyl-1-(2-amino-4-methoxy-s-triazinyl-(6)-ethyl)-4-phenylpiperazinium iodide—as colorless needles melting at 158°.

*Example 2*

A solution of metallic sodium (2 g.) in ethanol (50 cc.) is added to a solution of guanyl-O-ethylisourea hydrochloride (7 g.) in ethanol (50 cc.), and ethyl 3-(4-phenylpiperazino)propanoate (11 g.) is added to the mixture. The whole mixture is allowed to stand at room temperature for three days, and concentrated to remove ethanol. Water is added to the residue to make the whole volume 300 cc. The aqueous mixture is further allowed to stand for three days, and concentrated to separate crystals, which are collected and recrystallized from diluted ethanol to obtain 2-amino-4-ethoxy-6-[2-(4-phenylpiperazino)ethyl]-s-triazine (1 g.) as colorless needles melting at 131–132°.

*Example 3*

A solution of metallic sodium (2 g.) in methanol (40 cc.) is added to a solution of guanyl-O-methylisourea hydrochloride (6.5 g.) in methanol (40 cc.), followed by the addition of methyl 4-(4-phenylpiperazino)butanoate (11.8 g.). The mixture is allowed to stand at room temperature for four days, and concentrated. Water is added to the residue. The resulting precipitates are collected and recrystallized from aqueous ethanol to obtain 2-amino-4-methoxy-6-[3-(4-phenylpiperazino)propyl]-s-triazine (4.6 g.) as colorless crystals melting at 146–147°.

*Example 4*

A solution of metallic sodium (1.8 g.) in methanol (40 cc.) is added to a solution of guanyl-O-methylisourea hydrochloride (5.8 g.) in methanol (40 cc.), followed by the addition of methyl 3-(4-o-tolylpiperazino)propanoate (10 g.). The mixture is allowed to stand at room temperature for three days, and concentrated. Water is added to the residue. The resulting precipitates are collected and recrystallized from aqueous ethanol to obtain 2-amino-4-methoxy-6-[2-(4-o-tolylpiperazino)ethyl]-s-triazine (4.2 g.) as colorless crystals melting at 175–178°.

*Example 5*

A solution of metallic sodium (2 g.) in methanol (40 cc.) is added to a solution of guanyl-O-methylisourea hydrochloride (6.5 g.) in methanol (40 cc.), followed by the addition of ethyl 3-(4-p-tolylpiperazino)propanoate (11.8 g.). The mixture is allowed to stand at room temperature for three hours, and concentrated. Water is added to the residue, and the resulting precipitates are collected and recrystallized from aqueous ethanol to obtain 2-amino - 4 - methoxy - 6 - [2 - (4 - tolylpiperazino)ethyl]-s-triazine (4.7 g.) as colorless crystals melting at 148–149°.

*Example 6*

A solution of metallic sodium (1.9 g.) in methanol (40 cc.) is added to a solution of guanyl-O-methylisourea hydrochloride (6.1 g.) in methanol (40 cc.), followed by the addition of ethyl 3-(4-o-chlorophenylpiperazino)

propanoate (11.9 g.). The mixture is allowed to stand at room temperature for three days, and concentrated. Water is added to the residue, and the resulting precipitates are collected and recrystallized from aqueous ethanol to obtain 2-amino-4-methoxy-6-[2-(4-o-chlorophenylpiperazino)ethyl]-s-triazine (5 g.) as colorless crystals melting at 185–186°.

*Example 7*

A solution of metallic sodium (1.9 g.) in methanol (40 cc.) is added to a solution of guanyl-O-methylisourea hydrochloride (6.1 g.) in methanol (40 cc.), followed by the addition of ethyl 3-(4-p-chlorophenylpiperazino)propanoate (11.9 g.). The mixture is allowed to stand at room temperature for three days, and concentrated. Water is added to the residue, and the resulting precipitates are collected and recrystallized from aqueous methanol to obtain 2-amino-4-methoxy-6-[2 - (4 - p - chlorophenylpiperazino)ethyl]-s-triazine (3.9 g.) as colorless flakes melting at 179–181°.

*Example 8*

A solution of metallic sodium (1.7 g.) in methanol (40 cc.) is added to a solution of guanyl-O-methylisourea hydrochloride (5.5 g.) in methanol (40 cc.), followed by the addition of ethyl 3-(4-phenylpiperazino)butanoate (10 g.). The mixture is allowed to stand at room temperature of four days, and concentrated. Water is added to the residue and the aqueous mixture is extracted with chloroform. The chloroform layer is concentrated to leave residue, which is treated with benzene and recrystallized from aqueous ethanol to obtain 2-amino-4-methoxy-6-[2-(4-phenylpiperazino)propyl]-s-triazine as colorless crystals melting at 158–160°.

*Example 9*

A solution of metallic sodium (1.6 g.) in methanol (40 cc.) is added to a solution of guanyl-O-methylisourea hydrochloride (5.5 g.) in methanol (40 cc.), followed by the addition of ethyl 3-(4-o-methoxyphenylpiperazino)propanoate (10.5 g.). The mixture is allowed to stand for three days, and concentrated. Water is added to the residue. The resulting precipitates are collected and recrystallized from aqueous methanol to obtain 2-amino-4-methoxy-6-[2-(4 - o - methoxyphenylpiperazino)ethyl]-s-triazine (4.4 g.) as colorless needles melting at 185–186°.

*Example 10*

A solution of metallic sodium (1.9 g.) in methanol (40 cc.) is added to a solution of guanyl-O-methylisourea hydrochloride (6.1 g.) in methanol (40 cc.), followed by the addition of ethyl 3-(4-m-chlorophenylpiperazino)propanoate (11.9 g.). The mixture is allowed to stand at room temperature for five days, and concentrated. Water is added to the residue, and the resulting precipitates are collected and recrystallized from aqueous ethanol to obtain 2-amino-4-methoxy-6-[(2-(4-m-chlorophenylpiperazino)ethyl]-s-triazine (2.6 g.) as colorless flakes melting at 168–170°.

*Example 11*

A solution of metallic sodium (1.6 g.) in methanol (40 cc.) is added to a solution of guanyl-O-methylisourea hydrochloride (5.5 g.) in methanol (40 cc.), followed by the addition of ethyl 4-(4-p-tolylpiperazino)butanoate (10.5 g.). The mixture is allowed to stand for four days, and concentrated. Water is added to the residue, and the resulting precipitates are collected and recrystallized from aqueous ethanol to obtain 2-amino-4-methoxy-6-[3-(4-p-tolylpiperazino)propyl]-s-triazine (3.6 g.) as colorless crystals melting at 151–152°.

*Example 12*

A solution of metallic sodium (1.7 g.) in ethanol (50 cc.) is added to a solution of guanyl-O-ethylisourea hydrochloride (6.1 g.) in ethanol (60 cc.) under agitation, followed by the addition of ethyl 3-(4-p-tolylpiperazino)propanoate (10 g.). The mixture is allowed to stand at room temperature for five days, and concentrated. Water is added to the residue, and the resulting precipitates are collected and recrystallized from aqueous ethanol to obtain 2-amino - 4 - ethoxy - 6 - [2-(4-p-tolylpiperazino)ethyl]-s-triazine (1.9 g.) as colorless needles melting at 158–160°.

Having thus disclosed the invention, what is claimed is:
1. A compound of the formula

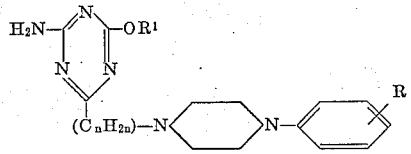

wherein $R^1$ is a member selected from the group consisting of methyl and ethyl, R is a member selected from hydrogen, a halogen, methyl and methoxy, and $n$ is an integer from 2 to 3.
2. Pharmaceutically acceptable salts of a compound as claimed in claim 1.
3. Hydrochloride of a compound as claimed in claim 1.
4. Methiodide of a compound as claimed in claim 1.
5. 2-amino-4 - methoxy - 6 - [2 - (4 - phenylpiperazino)ethyl]-s-triazine.
6. 2 - amino-4 - ethoxy - 6 - [2 - (4 - phenylpiperazino)ethyl]-s-triazine.
7. 2-amino-4 - methoxy - 6 - [3 - (4 - phenylpiperazino)propyl]-s-triazine.
8. 2-amino-4 - methoxy - 6 - [2 - (4 - phenylpiperazino)propyl]-s-triazine.
9. 2-amino - 4 - methoxy - 6 - [2 - (4 - o - chlorophenylpiperazino)ethyl]-s-triazine.
10. 2-amino-4 - methoxy - 6 - [2 - (4 - p - chlorophenylpiperazino)ethyl]-s-triazine.
11. 2-amino-4 - methoxy - 6 - [2 - (4 - m - chlorophenylpiperazino)ethyl]-s-triazine.
12. 2-amino-4 - methoxy - 6 - [2- (4-o-tolylpiperazino)ethyl]-s-triazine.
13. 2-amino-4-methoxy-6 - [2 - (4 - p - tolylpiperazino)ethyl]-s-triazine.
14. 2-amino-4-methoxy-6 - [3 - (4 - p - tolylpiperazino)propyl]-s-triazine.
15. 2-amino-4-ethoxy - 6 - [2 - (4 - p - tolylpiperazino)ethyl]-s-triazine.
16. 2-amino-4-methoxy-6 - [2 - (4 - o - methoxyphenylpiperazino)ethyl]-s-triazine.

References Cited by the Examiner
UNITED STATES PATENTS
3,169,963   2/1965   Peters et al. _____ 260—248

WALTER A. MODANCE, *Primary Examiner.*
JOHN M. FORD, *Assistant Examiner.*